United States Patent [19]

Dueber

[11] 4,162,162

[45] Jul. 24, 1979

[54] DERIVATIVES OF ARYL KETONES AND p-DIALKYL-AMINOARYLALDEHYDES AS VISIBLE SENSITIZERS OF PHOTOPOLYMERIZABLE COMPOSITIONS

[75] Inventor: Thomas E. Dueber, Wilmington, Del.

[73] Assignee: E. I. Du Pont de Nemours and Company, Wilmington, Del.

[21] Appl. No.: 903,947

[22] Filed: May 8, 1978

[51] Int. Cl.² .............................................. G03C 1/70
[52] U.S. Cl. .................................. 96/115 P; 96/35.1
[58] Field of Search ................. 96/115 P, 115 R, 35.1

[56] References Cited

U.S. PATENT DOCUMENTS

| | | | |
|---|---|---|---|
| 3,479,185 | 11/1969 | Chambers | 96/84 |
| 3,549,367 | 12/1970 | Chang et al. | 96/35.1 |
| 3,652,275 | 3/1972 | Baum et al. | 96/48 |

*Primary Examiner*—John D. Welsh

[57] ABSTRACT

This invention relates to new photopolymerizable compositions. More particularly, this invention pertains to photopolymerizable compositions containing photodissociable initiators in combination with selected sensitizers derived from aryl ketones and p-dialkylaminoarylaldehydes that absorb in the visible region of the spectrum.

17 Claims, No Drawings

DERIVATIVES OF ARYL KETONES AND p-DIALKYL-AMINOARYLALDEHYDES AS VISIBLE SENSITIZERS OF PHOTOPOLYMERIZABLE COMPOSITIONS

BACKGROUND ART

Much work has been done in the field of photopolymerization to increase the polymerization speed of these compositions. Many of the well-known photoinitiators or photoinitiator systems used, however, limit the applicability of the photopolymerizable compositions and elements because the initiators are activatible primarily in the ultraviolet region of the spectrum.

Chambers U.S. Pat. No. 3,479,185 discloses photopolymerizable compositions containing an ethylenically unsaturated monomer, a free radical producing agent such as a leuco triphenylamine dye and a hexaarylbiimidazole. These compositions are photoinitiatable in the ultraviolet region of the spectrum. Chambers, however, found that by adding energy-transfer dyes of the xanthene and acridine classes the sensitivity of the photopolymerizable compositions was extended into the visible spectral region with an increase in speed of polymerization.

Chang U.S. Pat. No. 3,549,367 discloses photopolymerizable compositions containing hexaarylbiimidazoles and p-aminophenyl ketones, e.g., Michler's ketone, which extend the spectral sensitivity of the compositions slightly into the visible region of the spectrum. Baum and Henry U.S. Pat. No. 3,652,275 further enhances the efficiency of the hexaarylbiimidazole systems in photopolymerizable compositions through the use of selected bis-(p-dialkylaminobenzylidene) ketone sensitizers.

While the aforementioned compositions have provided improved visible light sensitization of photopolymerizable compositions, further improvement in photo speed is desirable so that lower energy exposure sources can be used or the efficiency of imagewise polymerization exposure improved. Furthermore, improved sensitization enables the exposure source to be maintained at a greater distance from the photopolymerizable layer thereby allowing for greater collimation of radiation from the exposure source. It is also desirable to provide improved speed of sensitization in the visible region of the spectrum particularly for use in a photopolymerizable composition containing specific nitroaromatic compounds as photoinhibitors which are capable of producing positive polymeric images by means of a double exposure process, first imagewise in the ultraviolet region of the spectrum and then overall in the visible region of the spectrum. Nitroaromatic photoinhibitors and process for producing positive polymeric images are disclosed in Pazos, U.S. Ser. No. 758,699, filed Jan. 17, 1977.

DISCLOSURE OF INVENTION

In accordance with this invention, a photopolymerizable composition is provided which comprises an admixture of (1) at least one non-gaseous ethylenically unsaturated compound having a boiling point above 100° C. at normal atmospheric pressure and being capable of forming a high molecular weight polymer by photoinitiated, addition polymerization;

(2) at least one 2,4,5-triarylimidazolyl dimer consisting of two lophine radicals bound together by a single covalent bond; and (3) a sensitizing amount of an arylylidene aryl ketone compound of the formulae:

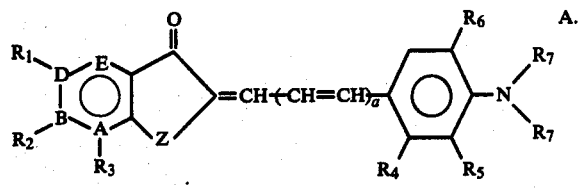

wherein:
A, B, D, E are carbon atoms or one may be solely a nitrogen atom;
$R_1$ is H, OH or $CH_3O$;
$R_2$ is H, OH, $CH_3O$ or $N(R_6)_2$;
$R_3$ is H, OH or $CH_3O$;
a is 0 or 1;
Z is $>C=O$, $>CHOH$, $>C(CH_3)_2$, $-(CH_2)_b-$, wherein b is 1, 2, or 3,

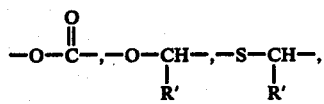

wherein R' is H, phenyl, or Z is linked with $R_4$ where Z is

and $R_4$ is $-O-$ or $>N-CH_3$, a being 0;
$R_4$ is H, $CH_3$, OH, $CH_3O$;
$R_5$ is H or $R_5+R_7$ is $-CH_2CH_2-$, $-CH_2CH_2CH_2-$, $-O-CH_2CH_2-$;
$R_6$ is H or $R_6+R_7$ is $-CH_2CH_2-$, $-CH_2CH_2CH_2-$, $O-CH_2CH_2-$; and
$R_7$ is $CH_3$, $-(CH_2)_n-CH_3$ where n is 1 to 5, $-CH_2CH_2-Cl$, $-CH_2CH_2OH$, $CH_2CH_2OCH_3$;

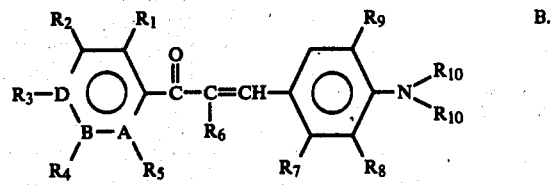

wherein:
A, B, D are carbon atoms or one may be solely a nitrogen atom;
$R_1$ is H, $CH_3$, $-OCH_2CH_2OR$, wherein R is H, $CH_3$, $-CH_2CH_2OR'$ wherein R' is $CH_3$ or $CH_3CH_2-$;
$R_2$ is H, $CH_3$, OH, or $CH_3O$;
$R_3$ is H, OH, $CH_3O$, $CH_3$, F, Br, CN or $N(R_9)_2$;
$R_2+R_3$ is $-O-CH_2-O-$;
$R_4$ is H, $CH_3$ or $CH_3O$;
$R_5$ is H, $CH_3$, $-OCH_2CH_2OR$, wherein R is H, $CH_3$, $-CH_2CH_2OR'$ wherein R' is $CH_3$ or $CH_3CH_2-$;
$R_6$ is H, $CH_3$ or phenyl;
$R_7$ is H, $CH_3$, OH or $CH_3O$;
$R_8$ is H;

$R_8 + R_{10}$ is —$CH_2CH_2$—, —$CH_2CH_2CH_2$—, —$OCH_2CH_2$;

$R_9$ is H, $R_9 + R_{10}$ is —$CH_2CH_2$—, —$CH_2CH_2CH_2$—, —$OCH_2CH_2$—; and $R_{10}$ is $CH_3$, —$(CH_2)_n CH_3$ wherein n is 1 to 5; and

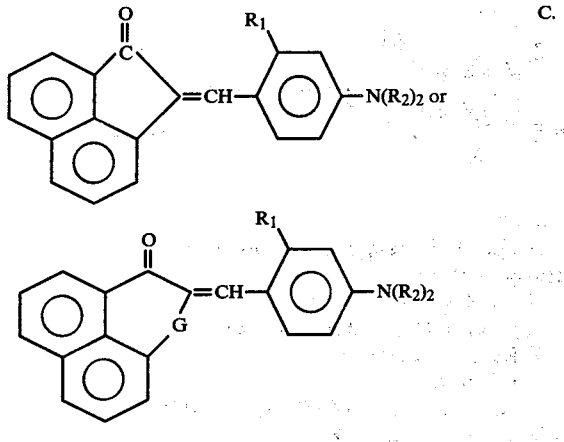

wherein
G is

—O—, or —S—;
$R_1$ is H, $CH_3$ or —$OCH_3$, and
$R_2$ is $CH_3$ or —$CH_2CH_3$,
the ketone having its maximum absorption in the range of 350 to 550 nm.

The photopolymerizable compositions in addition to containing at least one ethylenically unsaturated compound, 2,4,5-triarylimidazolyl dimer, and an arylylidene aryl ketone preferably contain macromolecular organic binders. Other useful additives include: leuco dyes that are oxidizable to a dye by the triarylimidazolyl radicals, photoinhibitors, and inert components such as plasticizers, dyes and pigments to increase visibility of the image, fillers, etc.

The ethylenically unsaturated compound can be present in the photopolymerizable composition in an amount of 3.0 to 100 parts by weight, and the organic binder can be present in an amount of 0 to 97 parts by weight based on the weight of monomer and binder. The 2,4,5-triarylimidazolyl dimer can be present in an amount of 0.01 to 20.0 parts by weight per 100 parts by weight of the combined weight of ethylenically unsaturated compound and binder. The arylylidene aryl ketone sensitizer can be present in an amount of 0.001 to 15.0 parts by weight, preferably 1.0 to 10.0 parts by weight, per 100 parts by weight of the combined weights of ethylenically unsaturated compound and binder. The other additives can be present in minor amounts known to those skilled in the art.

The ethylenically unsaturated compounds (1) (photopolymerizable monomers of this invention) have a boiling point above 100° C. at normal atmospheric pressure and are capable of forming a high polymer by photoinitiated, addition polymization. Suitable compounds are disclosed in Chang U.S. Pat. No. 3,756,827, column 2, line 36 to column 3, line 30, the disclosure of which is incorporated herein by reference. Other useful monomers include ethylenically unsaturated diester polyhydroxy polyethers as described in Chambers et al U.S. Ser. No. 892,295 filed Mar. 31, 1978. Examples include the Epocryl® resins sold by Shell Chemical Co. Many of the polymerizable monomers are subject to thermal polymerization, expecially when stored for long periods or at elevated temperatures. When such compounds are supplied commercially, it is customary for them to contain a small, but effective, amount of a thermal polymerization inhibitor. These inhibitors may be left in the monomers when the photopolymerizable coating compositions of this invention are prepared, as was done in the examples which follow. The resulting compositions usually have satisfactory thermal stability. If unusual thermal exposure is anticipated, or if monomers containing little or no thermal polymerization inhibitor are employed, compositions with adequate shelf life can be obtained by incorporating, e.g., up to 0.5 percent, by weight of monomer, of a thermal polymerization inhibitor such as hydroquinone, methylhydroquinone, p-methoxyphenol, etc.

The 2,4,5-triarylimidazolyl dimers (2,2',4,4',5,5'-hexaarylbiimidazoles) are photodissociable to the corresponding triarylimidazolyl radicals. These hexaarylbiimidazoles absorb maximally in the 255–275μ region, and usually show some, though lesser absorption in the 300–375 mμ region. Although the absorption bands tend to tail out to include wavelengths as high as about 430 mμ, they normally require light rich in the 255–375 mμ wavelengths for their dissociation.

The hexaarylbiimidazoles can be represented by the formula

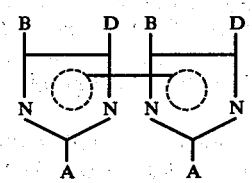

wherein A, B and D represent aryl groups which can be the same or different, carbocyclic or heterocyclic, unsubstituted or substituted with substituents that do not interfere with the dissociation of the hexaarylbiimidazole to the triarylimidazolyl radical or with the oxidation of the leuco dye, and each dotted circle stands for four delocalized electrons (i.e., two conjugated double bonds) which satisfy the valences of the carbon and nitrogen atoms of the imidazolyl ring. The B and D aryl groups can each be substituted with 0–3 substitutents and the A aryl groups can be substituted with 0–4 substituents. Useful 2,4,5-triarylimidazolyl dimers are disclosed in Baum & Henry U.S. Pat. No. 3,652,275 column 5, line 44 to column 7, line 16, the disclosure of which is incorporated herein by reference.

The arylylidene aryl ketone sensitizers useful in the photopolymerizable compositions have been defined broadly above. Preferred sensitizer compounds are of the following structures:

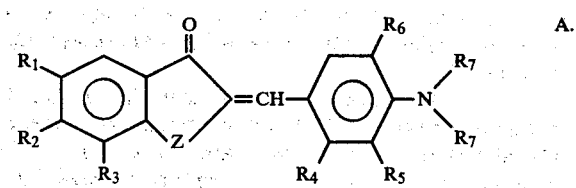

$R_1$ is H, OH, $CH_3O$—;
$R_2$ is H, OH, $CH_3O$—;
$R_3$ is H, OH, $CH_3O$— with the proviso that if one of $R_1$, $R_2$, or $R_3$ is OH then the remainder must be H or $CH_3O$—;

Z is

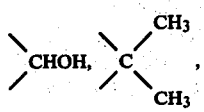

$-(CH_2)_a$ wherein a is 1, 2 or 3,

wherein R' is H, $\phi$, or
Z is linked with $R_4$ where Z is

and $R_4$ is —O— or

$R_4$ is H, $CH_3$, OH, $CH_3O$— with the proviso that if one of $R_1$, $R_2$, or $R_3$ is OH then $R_4$ is one of H, $CH_3$ or $CH_3O$—;
$R_5$ is H or $R_5+R_7$ is —$CH_2CH_2$—, —$CH_2CH_2CH_2$—, —O—$CH_2CH_2$—;
$R_6$ is H or $R_6+R_7$ is —$CH_2CH_2$—, —$CH_2CH_2CH_2$—, —O—$CH_2CH_2$—;
$R_7$ is $CH_3$—, $CH_3CH_2$—;

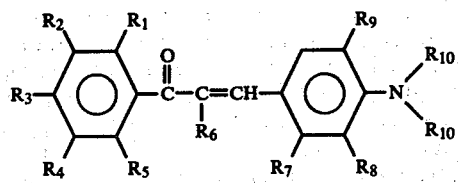

B.

$R_1$ is H, $CH_3$;
$R_2$ is H, OH, $CH_3$, $CH_3O$;
$R_3$ is H, $CH_3$, OH, $CH_3O$;
$R_2+R_3$ is —O—$CH_2$—O—;
$R_4$ is H, $CH_3$—, $CH_3O$—;
$R_5$ is H, $CH_3$;
$R_6$ is H, $CH_3$;
$R_7$ is H, $CH_3$, OH, $CH_3O$ with the proviso that if one of $R_2$, $R_3$ or $R_7$ is OH then the remainder must be H, $CH_3$ or $CH_3O$—;
$R_8$ is H, $R_8+R_{10}$ is —$CH_2CH_2$—, —$CH_2CH_2CH_2$—, —O—$CH_2CH_2$—;
$R_9$ is H, $R_9+R_{10}$ is —$CH_2CH_2$, —$CH_2CH_2CH_2$—, —O—$CH_2CH_2$—;
$R_{10}$ is $CH_3$—, $CH_3CH_2$—.

The sensitizers illustrated in the Examples are as follows:

| Example | Name of Sensitizer |
|---|---|
| 1 | 2-(4'-diethylamino-2'-methylbenzylidene)-1-indanone |
| 2 | 2-(4'-diethylaminobenzylidene)-3-hydroxy-1-indanone |
| 3 | 8-(4'-dimethylaminobenzylidene)-acenaphthalene-7-one |
| 4 | 2-(4'-diethylamino-2'-methylbenzylidene)-1-tetralone |
| 5 | 4-diethylamino-2-methylbenzylideneacetophenone |
| 6 | 4'-dimethylaminobenzylidene-4-dimethylaminoacetophenone |
| 8 | 4'-diethylamino-2'-methyl-benzylidene-2-[β-(β'-methoxy-ethoxy)-ethoxy]acetophenone |
| 9 | 4'-diethylamio-2'-methyl-benzylidene-2-methylacetophenone |
| 10 | 4'-diethylamino-2'-methyl-benzylidene-4-fluoroacetophenone |
| 11 | 4'-diethylamino-2'-methyl-benzylidene-4-cyanoacetophenone |
| 12 | 2-(4'-diethylaminobenzylidene)-3-phenyl-1-chromanone |
| 13 | 2-(4'-diethylaminobenzylidene)-1-chromanone |
| 14 | 2-(4'-diethylaminobenzylidene)-chroman-1,3-dione |
| 15 | 2-[4'-di-(β-chloroethyl)amino-benzylidene]-3-hydroxy-1-indanone |
| 16 | 2-(4'-diethylamino-2'-methylbenzylidene)-3-hydroxy-1-indanone |
| 17 | 2-(4'-dimethylaminocinnamyl-idene)-3-hydroxy-1-indanone |
| 18 | 2-(4'-diethylamino-2'-methyl-benzylidene)-1-tetralone |
| 19 | 2-(4'-diethylamino-2'-methyl-benzylidene)-1-benzosuberone |
| 20 | 2-(4'-diethylamino-2'-methyl-benzylidene)-5,6-dimethoxy-1-indanone |
| 21 | 4'-diethylamino-2'-methyl-benzylidene-3,4-methylene-dioxyacetophenone |
| 22 | 4'-diethylamino-2'-methyl-benzylidene-4-methoxy-acetophenone |
| 23 | 4'-diethylamino-2'-methyl-benzylidene-3-methoxy-acetophenone |
| 24 | 4'-diethylamino-2'-methyl-benzylidene-4-methylaceto-phenone |
| 26 | 2-(4'-diethylamino-2'-methoxybenzylidene)-1-indanone |
| 27 | 2-(9'-julolylidene)-1-indanone |
| 28 | 2-(4'-diethylaminobenzylidene)-1-tetralone |
| 29 | 2-(4'-diethylaminobenzylidene)-propiophenone |
| 30 | 2-(4'-diethylamino-2'-methyl-benzylidene)-propiophenone |
| 31 | 4-diethylaminobenzylidene-deoxybenzoin |
| 39 | 2-(4'-diethylaminobenzylidene)-1-indanone |
| 40 | 2-(4'-diethylaminobenzylidene)-3-gemdimethyl-1-indanone |
| 47 | 4'-diethylamino-2'-methylbenzylidene-4-hydroxyacetophenone |
| 48 | 4'-dimethylaminobenzylidene-3-hydroxyacetophenone |

The arylylidene aryl ketones can be prepared according to procedures set forth in Examples 1 and 32 below according to known procedures reacting specific aryl ketones and p-dialkylaminoarylaldehydes. After purification, melting points, ultraviolet spectral data can be determined as shown below, e.g., in Table 3. The sensitizers absorb radiation in the broad spectral range of 300 to 700 nm. The maximum absorption ($\lambda$max.) is in the range of 350 to 550 nm, preferably 400 to 500 nm.

Preferably thermoplastic macromolecular organic polymeric binders are present in the photopolymerizable compositions. Polymeric binder types include: (a) copolyesters based on terephthalic, isophthalic, sebacic, adipic and hexahydroterephthalic acids; (b) nylons or polyamides; (c) vinylidene chloride copolymers; (d) ethylene/vinyl acetate copolymers; (e) cellulosic ethers; (f) polyethylene; (g) synthetic rubbers; (h) cellulose esters; (i) polyvinyl esters including polyvinyl acetate/acrylate and polyvinyl acetate/methacrylate copolymers; (j) polyacrylate and poly-$\alpha$-alkyl-acrylate esters, e.g., polymethyl methacrylate and polyethyl methacrylate; (k) high molecular weight ethylene oxide polymers (polyethylene glycols) having average molecular weights from 4000–4,000,000; (l) polyvinyl chloride and copolymers; (m) polyvinyl acetal; (n) polyformaldehydes; (o) polyurethanes; (p) polycarbonates; and (q) polystyrenes.

In a particularly preferred embodiment of the invention, the polymeric binder is selected so that the unexposed photopolymerizable coating is soluble in predominantly aqueous solutions, for example dilute aqueous alkaline solutions, but upon exposure to actinic radiation becomes relatively insoluble therein. Typically, polymers which satisfy these requirements are carboxylated polymers, for example vinyl addition polymers containing free carboxylic acid groups. Another preferred group of binders includes polyacrylate esters and poly-$\alpha$-alkyl-acrylate esters, particularly polymethyl methacrylate.

Optionally leuco dyes can also be present in the photopolymerizable composition. By the term "leuco dye" is meant the colorless (i.e., the reduced) form of a dye compound which can be oxidized to its colored form by the triarylimidazolyl radical. Leuco dyes are disclosed in Baum & Henry U.S. Pat. No. 3,652,275, column 7, line 24 to column 11, line 32, the disclosure of which is incorporated herein by reference.

In preferred positive working photopolymerizable compositions, nitroaromatic photoinhibitors as disclosed in Belgian Pat. No. 852,517 granted Sept. 16, 1977, are present. These compounds which can be present in amounts of 0.5 to 15 parts by weight per 100 parts by weight of the combined weight of ethylenically unsaturated compound and binder are defined by the formula:

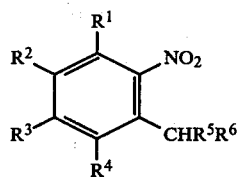

wherein $R^1$, $R^2$, $R^3$ and $R^4$, alike or different, are H, OH, halogen, $NO_2$, CN, alkyl of 1 to 18 carbons, alkoxy in which the alkyl is of 1 to 18 carbons, aryl of 6 to 18 carbons, benzyl, halogen-substituted phenyl, polyether of 2 to 18 carbons and 1 to 6 oxygens, dialkylamino in which each alkyl is of 1 to 18 carbons, thioalkyl in which the alkyl is of 1 to 18 carbons, or thioaryl in which the aryl is of 6 to 18 carbons, or any two of $R^1$, $R^2$, $R^3$ and $R^4$, taken together, are the residue of a second benzene ring fused onto the benzene nucleus, with the proviso that not more than one of $R^1$, $R^2$, $R^3$ and $R^4$ is OH or $NO_2$;

$R^5$ is H, alkyl of 1 to 18 carbons, halogen, phenyl, or alkoxy in which the alkyl is of 1 to 18 carbons;

$R^6$ is H, OH, alkyl of 1 to 18 carbons, phenyl, or alkoxy in which the alkyl is of 1 to 18 carbons, with the proviso that only one of $R^5$ and $R^6$ is H, or;

$R^5$ and $R^6$ together are $=O$, $=CH_2$, $-O-CH_2-$; $=NC_6H_5$, $=NC_6H_4N(alkyl)_2$ in which each alkyl is of 1 to 18 carbons, $-O-C_2H_4-O-$,

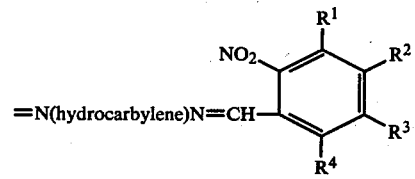

in which the hydrocarbylene group is of 1 to 18 carbons, or

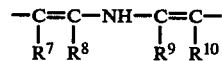

in which $R^8$ and $R^9$, alike or different, are H or alkyl of 1 to 4 carbons, and $R^7$ and $R^{10}$, alike or different, are $-CN$, $-COR^{11}$ in which $R^{11}$ is alkyl of 1 to 5 carbons, or $-COOR^{12}$ in which $R^{12}$ is alkyl of 1 to 6 carbons which may be interrupted by an oxygen atom, alkenyl of 2 to 5 carbons, or alkynyl of 2 to 5 carbons, or $R^7$ and $R^8$ together, or $R^9$ and $R^{10}$ together, complete a 6-membered carbocyclic ring containing a keto group.

A wide range of non-polymerizable plasticizers are effective in achieving improved exposure and development temperature latitude. When a macromolecular binder is present in the layer, plasticizer selection would be based on those well known in the art to be compatible with it as well as the monomer, dimer, ketone and other components. With acrylic binders, for example, dibutyl phthalate and other esters of aromatic acids; esters of aliphatic polyacids such as diisooctyl adipate, nitrate esters, etc.; aromatic or aliphatic acid esters of glycols, polyoxyalkylene glycols, aliphatic polyols, etc.; alkyl and aryl phosphates; low molecular weight polyesters of poly-$\alpha$-methylstyrenes; chlorinated paraffins; and sulfonamide types may be used. In general, water insoluble plasticizers are preferred for greater high humidity storage stability, but are not necessary to get improved latitude. Other inert additives such as dyes, pigments and fillers are known to those skilled in the art. These additives are generally present in minor amounts and should not interfere with the exposure of the photopolymerizable layer.

The photopolymerizable compositions described herein may be coated on a wide variety of subtrates. By "substrate" is meant any natural or synthetic support, preferably one which is capable of existing in a flexible or rigid film or sheet form. For example, the substrate could be a metal sheet or foil, a sheet or film of synthetic organic resin, cellulose paper, fiberboard, and the like, or a composite of two or more of these materials. Specific substrates include alumina-blasted aluminum, anodized aluminum, alumina-blasted polyethylene terephthalate film, polyethylene terephthalate film, e.g., resin-subbed polyethylene terephthalate film, polyvinyl alcohol-coated paper, crosslinked polyester-coated paper, nylon, glass, cellulose acetate film, heavy paper such as lithographic paper, and the like.

The particular substrate will generally be determined by the use application involved. For example, when printed circuits are produced, the substrate may be a plate which is a copper coating on fiberboard; in the preparation of lithographic printing plates, the substrate is anodized aluminum.

Preferably the layer of the photopolymerizable compositions have a thickness ranging from about 0.0001 inch (~0.0003 cm) to about 0.01 inch (0.025 cm) and are adhered with low to moderate adherence to a thin, flexible, polymeric film support which may transmit radiation actinic to the photopolymerizable layer. The opposite side of the photopolymerizable layer may have adhered thereto a protective cover layer or cover sheet wherein the sheet has less adherence to the layer than the adherence between the film support and the layer. A particularly preferred support is a transparent polyethylene terephthalate film having a thickness of about 0.001 inch (~0.0025 cm). Polyethylene, 0.001 inch (~0.0025 cm) is a preferred cover sheet; polyvinyl alcohol coating is a preferred cover layer.

Any convenient source of actinic radiation providing wavelengths in the region of the spectrum that overlap the arylylidene aryl ketone sensitizers absorption bands can be used to activate the photopolymerizable compositions for triarylimidazolyl radical formation, image formation and photopolymerization initiation. The light can be natural or artificial, monochromatic or polychromatic, incoherent or coherent, and for high efficiency should correspond closely in wavelengths to the sensitizer's principal absorption bands and should be sufficiently intense to activate a substantial proportion of the sensitizer.

Conventional light sources include fluorescent lamps, mercury, metal additive and arc lamps providing narrow or broad light bands centered near 405, 436 and 546 nm (Hg) wavelengths. Coherent light sources are the pulsed xenon, argon ion, and ionized neon-lasers whose emissions fall within or overlap the visible absorption bands of the sensitizer. Ultraviolet and visible emitting cathode ray tubes widely useful in printout systems for writing on photosensitive materials are also useful with the subject compositions. These in general involve an ultraviolet or visible-emitting phosphor internal coating as the means for converting electrical energy to light energy and a fiber optic face plate as the means for directing the radiation to the photosensitive target.

Best Mode for Carrying out the Invention

The best mode is illustrated in Example 1 wherein the sensitizer compound, 2-(4'-diethylamino-2'-methylbenzylidene)-1-indanone, is added to a photopolymerizable formulation which is coated onto an aluminum plate at a coating weight of 50 mg/dm². A polyvinyl alcohol containing layer is coated over the photopolymerizable layer, and the element formed is imagewise exposed in a vacuum frame to a mercury lamp source. An ultraviolet filter, as described in Example 1, is placed over the photopolymerizable layer which is then exposed. After development and rinsing with water as described in Example 1, a lithographic printing plate is obtained.

Industrial Applicability

The photopolymerizable compositions of this invention are useful in printing plates for offset and letter press, engineering drafting films, as well as photoresists in making printed circuits or in chemical milling, and as soldermasks. In printing plate applications, an important use is in a positive/negative two exposure imaging system of a positive photopolymer litho printing plate. The compositions are also useful in positive working photopolymer litho films. Still other uses are for preparing colored images from color separation negatives suitable for color-proofing. The images formed with these elements may be used for making copies by thermal transfer to a substrate. Specific uses will be evident to those skilled in the art.

In photoresist applications, thin film resists prepared from the composition are useful in the preparation of microcircuits. The resists can be either solvent soluble or aqueous developable. Solder masks are protective coatings which are selectively applied to portions of a printed circuit board surface to confine solder to pad areas on the board and to prevent bridging between conductors during tinning operations and during soldering of components. A solder mask also functions to prevent or minimize corrosion of the base copper conductors and as a dielectric to insulate certain components for adjacent circuitry.

Photopolymerizable compositions containing the arylylidene aryl ketone sensitizers of this invention surprisingly show improved visible light sensitization. The remarkable increase in speed results in a saving of energy and costs related thereto since lower energy exposure sources can be used in exposure of the photopolymerizable element or more elements can be exposed and developed in a given amount of time. Alternatively, the photopolymerizable layer can be exposed by means of an exposure source maintained at a greater distance than normal for known sensitized elements. This permits the exposing radiation to be collimated which is of particular advantage in forming halftone dots having substantially perpendicular sides. The broad sensitization range coupled with the effectiveness of sentization enables useful positive polymeric images to be formed by a double exposure process, first, imagewise in the ultraviolet region of the spectrum and the overall in the visible region of the spectrum utilizing specific nitroaromatic photoinhibitors.

EXAMPLES

The invention will be illustrated by the following examples wherein the percentages are by weight.

EXAMPLE 1

Preparation of 2-(4'-diethylamino-2'-methylbenzylidene)-1-indanone:

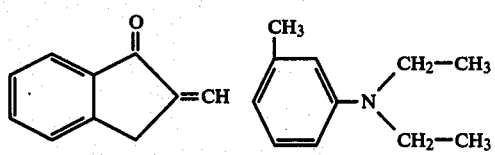

A solution of 50 g. (0.3785 mole) 1-indanone and 77.75 g. of 93% 4-diethylamino-2-methylbenzaldehyde in 150 ml. of ethanol was stirred and 94 ml. of a solution of warm (approx. 30° C.) 25% aqueous sodium hydroxide was added. This reaction mixture was heated to reflux for 45 minutes. A solid precipitate began appearing after 30 minutes. Next, the mixture was cooled to about 5° C. and the precipitate filtered and washed with petroleum ether. After air drying, the resulting solid was washed with water until the wash material was pH 7.0. The washed precipitate was recrystallized from 80% aqueous ethanol to yield 92.6 g. (80.1% yield) of 2-(4'-diethylamino-2'-methylbenzylidene)-1-indanone (m.p. 133.5°–134.5° C.), U.V. spectra and $\epsilon$ values are set forth in Table 3 below. The structure was confirmed by both infrared and nuclear magnetic resonance spectra.

To test the effectiveness of this compound as a sensitizer in a photopolymerizable element, the following stock solution was prepared:

| Component | Amt. (g.) |
|---|---|
| Resin binder[1] | 149.61 |
| Trimethylolpropane triacrylate | 22.4 |
| Plasticizer[2] | 7.1 |
| Bis(2-o-chlorophenyl-4,5-bis-phenyl) imidazole | 6.5 |
| Solvent Red Dye (C.I. #109) | 1.0 |
| Tri-(p-N,N-dimethylaminophenyl)-methane | 0.2 |
| 1,4,4-trimethyl-2,3-diazabicyclo-[3.2.2]-non-2-ene N,N-dioxide | 0.056 |
| Ethyl "Cellosolve" | 336.7 |

[1]Low molec. wt. co-polymer of methyl methacrylate/methacrylic acid in ethyl Cellosolve, 42.75% solids.
[2]Mixture of triethylene glycol dicaprate and triethylene glycol dicaprylate (Sp. Gr. = 0.966, Visc. = 15 cps at 25° C., Drew Chemical Corp., N.Y., N.Y.)

This material contained 18.57% as solids. A 50 g. sample was taken and 0.0825 g. of the sensitizer prepared above added thereto along with a 0.1718 g. sample of photoinhibitor (3,4-dimethoxy-6-nitrobenzaldehyde). This final mixture was spin coated on a 0.012 inch (0.30 mm) aluminum plate. The final coating weight of the photosensitive layer was 50 mg/dm². The photosensitive layer was then overcoated with a 10 mg/dm² layer comprising an aqueous solution of fully hydrolyzed polyvinyl alcohol having a mixture of vinyl pyrrolidone/vinyl acetate dispersed therein.

After this plate was dried, one half of the surface was covered by a black polyethylene sheet. A suitable target was then placed over the uncovered side and the plate was placed in a vacuum printing frame. An imagewise exposure was then made (positive exposure) to a 2000 watt mercury lamp at a distance of 38 inches (96.5 cm) using an "Ascor" Light Integrator Platemaker Model 1415-12 with a Berkey "Ascor" 1601-40 light source. The exposure was 20 units. The black polyethylene sheet was then removed and a $\sqrt[3]{2}$ step wedge was placed over the previously blocked-off section. A U.V. filter[3] was placed over the plate and the entire plate given a 100 unit exposure. This final exposure gave a negative exposure to the blocked-off section and completed the 2 exposure positive sequence on the other half. The exposed plate was then developed for 30 seconds at 22° C. in the following developer solution:

| | Amt. (%) |
|---|---|
| Sodium carbonate | 1.86 |
| Butyl carbitol | 11.32 |

| | Amt. (%) |
|---|---|
| Water | 88.82 |

The developed plate was then rinsed under running water while the imaged areas were being gently swabbed with a cotton pad. A high quality relief image plate suitable as a lithographic printing plate, was obtained. Both positive and negative images were on this plate. In the positive mode, the first step was completely unpolymerized while in the negative mode, step 13 was the last polymerized step in the image.

[3] The U.V. filter used in this example was prepared as follows:

| Polymer Solution | Amt. (g) |
|---|---|
| Cellulose acetate butyrate | 720.0 |
| Ethyl Cellosolve | 320.0 |
| Methylene chloride | 2,880.0 |
| (% solids is 18.36) | |

This solution was stirred for about 90 minutes. A sample of the U.V. absorber 2,2'-dihydroxy-4-methoxybenzophenone was added so that the final solution contained 10% U.V. absorber and 90% polymer solution. This material was coated on 0.004 inch (0.01 cm) resin-subbed polyethylene terephthalate film to a thickness of 0.00095 inch (0.024 mm) of U.V. absorber.

EXAMPLES 2-6

In a base catalyzed condensation reaction similar to that described in Example 1, the following sensitizers were prepared:

| Sample | Sensitizer |
|---|---|
| 2 | 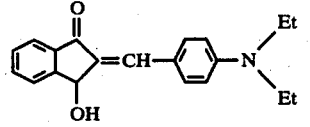 |
| 3 | 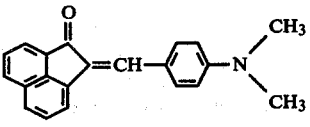 |
| 4 | 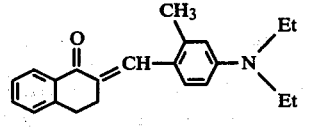 |
| 5 | 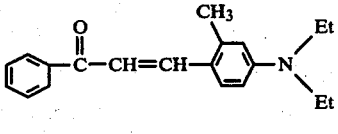 |
| 6 | 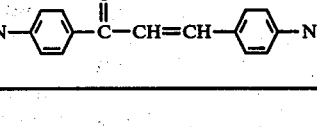 |

Visible absorption data are set forth in Table 3 below. These sensitizers were tested in the same photosensitive formulation given in Example 1 and coated, overcoated, exposed and developed as described therein with the following results:

Table 1

| Sensi-tizer | Amt. Used (g.) | Amt. of Photo-inhib. Used (g) | Exp. Units (+) | Exp. Units (−) | UV Filter | Stepwedge Response (+) | Stepwedge Response (−) |
|---|---|---|---|---|---|---|---|
| 2 | 0.0962 | 0.1711 | 20 | 100 | (1) | 1 | 11 |
| 3 | 0.1931 | 0.1737 | 30 | 200 | (1) | 4 | 4 |
| 4 | 0.1528 | 0.1718 | 40 | 200 | 1A(2) | 1 | 15 |
| 5 | 0.0475 | 0.1711 | 20 | 100 | 2C(2) | 1 | 13 |
| 6 | 0.0962 | 0.1732 | 80 | 100 | 2A(2) | <1 | 8(3) |

(1) Same UV filter as Example 1.
(2) Kodak Wratten filters.
(3) Developed for 60 seconds at 22° C.

These tests indicate that all are visible sensitizers and most perform well in the preparation of suitable positive/negative litho printing plates as described in Example 1.

EXAMPLE 7

The following photopolymerizable composition was prepared:

| Component | Wt. Used (g.) |
|---|---|
| Copolymer of styrene/maleic anhydride (1.4/1)-Mol. Wt. ca. 10,000 | 259.7 |
| Dispersion of: (a) Terpolymer: ethyl acrylate (56.6) methyl methacrylate (37.6), acrylic acid (7.0), Acid No. 76–85; Mol. Wt. ca. 260,000 — 55 parts; (b) Carbon Black — 45 parts | 383.0 |
| Tetraethylene glycol dimethacrylate | 70.1 |
| Trimetholpropane triacrylate | 70.1 |
| Sensitizer from Ex. 1 | 4.41 |
| 3,4-dimethoxy-6-nitrobenzyl 4'-methoxyphenyl ether | 60.0 |
| Bis (2-o-chlorophenyl-4,5-bis-phenyl) imidazole | 52.6 |
| "FC-430" (fluoro surfactant from 3M Co.) | 1.35 |
| 1,4,4-trimethyl-2,3-diazabicyclo [3.2.2] non-2-ene N,N'-dioxide | 0.44 |
| "Polyox" WSR-N-3000, M.W. ca. 400,000, (Polyoxyethylene coating aid, Union Carbide Corp.) | 9.0 |
| Methylene Chloride | 3,210.0 |
| Methyl Chloroform | 1,530.0 |
| Methanol | 350.0 |

This material was thoroughly mixed and then machine coated on the resin subbed side of a 0.004 inch (0.01 cm) polyethylene terephthalate film support at 100 ft/min (30.48 m/min). The coating was dried at 200° F. (93.3° C.) to yield a black, photopolymer layer with a coating weight of about 50 mg/dm². A second, photopolymerizable composition containing the following ingredients was prepared:

| Component | Wt. Used (g.) |
|---|---|
| Water (distilled) | 460.7 |
| Terpolymer as described above, 10% aqueous solution | 1,838.0 |
| "Misco" AC-392 (Polyethylene wax dispersed in water, Misco Products Co., Wheeling, Illinois) | 353.0 |
| "Triton" X-100 (octylphenoxy polyethoxy ethanol, dispersing agent, Rohm & Haas Co.) | 9.9 |
| Methylene chloride | 275.0 |
| Tetraethylene glycol dimethacrylate | 56.4 |
| Trimethylolpropane triacrylate | 56.4 |
| Sensitizer from Ex. 1 | 3.53 |
| Bis(2-o-chlorophenyl-4,5-bis-phenyl) imidazole | 42.3 |
| 1,4,4-trimethyl-2,3-diazabicyclo [3.2.2] non-2-ene-N,N'-dioxide | 0.36 |

This composition was stirred thoroughly to admix all components and the mixture was coated contiguous to the first photopolymer layer at 30 ft/min (914.4 cm/min). The resulting layer (ca. 30 mg/dm²) was dried at 220° F. (104.4° C.) and a 0.001 inch (0.0025 cm) polyester cover sheet was laminated thereon.

This composite, multilayered element was exposed for 20 seconds to a 4 KW pulsed Xenon arc at a distance of 60 inches (152.4 cm) through a photographic positive image in contact with the cover sheet. The positive image was then removed and the element reexposed for 20 seconds to the same light source through a cut-off filter which adsorbs all the light below 400 nm. The cover sheet was then removed and the film processed through an automatic processor described in U.S. Serial No. 830,477, filed September 6, 1977, at 7 ft/min (353.36 cm/min) and 72° F. (22.2° C.) to produce an exact duplicate of the original positive image.

EXAMPLES 8-31

In a manner similar to that described in Example 1, the following sensitizers were prepared:

| Sample | Sensitizer |
|---|---|
| 8 | 2-(2-methoxyethoxyethoxy)phenyl styryl ketone with 3-methyl-4-diethylamino group: φCOCH=CH-(3-CH₃,4-NEt₂-C₆H₃), ortho-OCH₂CH₂OCH₂CH₂OCH₃ |
| 9 | 2-methylphenyl COCH=CH-(3-CH₃,4-NEt₂-C₆H₃) |
| 10 | p-FφCOCH=CH-(3-CH₃,4-NEt₂-C₆H₃) |
| 11 | p-CNφCOCH=CH-(3-CH₃,4-NEt₂-C₆H₃) |
| 12 | flavanone with =CH-C₆H₄-NEt₂ (α-phenyl) (1) |
| 13 | chromanone-3-ylidene CH-C₆H₄-NEt₂ (1) |
| 14 | chroman-2,3-dione-3-ylidene CH-C₆H₄-NEt₂ (1) |
| 15 | 3-hydroxy-1-indanone-2-ylidene CH-C₆H₄-N(CH₂CH₂Cl)₂ |
| 16 | 3-hydroxy-1-indanone-2-ylidene CH-(3-CH₃,4-NEt₂-C₆H₃) |
| 17 | 3-hydroxy-1-indanone-2-ylidene CH=CH-CH=CH-C₆H₄-NMe₂ |
| 18 | 1-tetralone-2-ylidene CH-(3-CH₃,4-NEt₂-C₆H₃) |
| 19 | benzosuberone-2-ylidene CH-(3-CH₃,4-NEt₂-C₆H₃) |
| 20 | 5,6-dimethoxy-1-indanone-2-ylidene CH-(3-CH₃,4-NEt₂-C₆H₃) |
| 21 | 3,4-methylenedioxyphenyl COCH=CH-(3-CH₃,4-NEt₂-C₆H₃) |
| 22 | p-CH₃OφCOCH=CH-(3-CH₃,4-NEt₂-C₆H₃) |
| 23 | m-CH₃OφCOCH=CH-(3-CH₃,4-NEt₂-C₆H₃) |
| 24 | p-CH₃φCOCH=CH-(3-CH₃,4-NEt₂-C₆H₃) |
| 25 | φCOCH=CH-(3-CH₃,4-NEt₂-C₆H₃) |
| 26 | 1-indanone-2-ylidene CH-(2-OCH₃,4-NEt₂-C₆H₃) |
| 27 | 1-indanone-2-ylidene CH-(julolidinyl) |
| 28 | 1-tetralone-2-ylidene CH-C₆H₄-NEt₂ |
| 29 | φCOC(CH₃)=CH-C₆H₄-NEt₂ |

-continued

| Sample | Sensitizer |
|---|---|
| 30 | φCOC=CH–[C6H4(CH3)]–NEt2 with CH3 on vinyl |
| 31 | φCOC=CH–[C6H4]–NEt2 with φ on vinyl |

(1)These compounds were prepared by an acid catalyzed condensation reaction.

The visible absorption data are set forth in Table 3 below.

Sensitizers 8 to 31 were tested in the formulation set forth below using the photoinhibitor of Example 1 in an amount of 2.72 percent by weight of solids.

| Formulation | Amt. (g) |
|---|---|
| Tetraethylene glycol dimethacrylate | 15.0 |
| Terpolymer described in Example 7 | 35.3 |
| Copolymer of styrene/maleic anhydride described in Example 7 | 36.7 |
| Bis (2-o-chlorophenyl-4,5-bis-phenyl) imidazole | 8.6 |
| Chloroform | 527.0 |
| Methanol | 40.0 |

Each sample was coated on the resin subbed side of a 0.004 inch (0.01 cm) polyethylene terephthalate film support using a 0.002 inch (0.005 cm) doctor knife and a 0.001 inch (0.0025 cm) polyethylene terephthalate cover sheet laminated over the layer at 180° F. (82° C.) and at 4 ft/min (121.9 cm/min). Each sample was exposed as described in Example 1 using the same UV filter described in that Example. The cover sheets were removed, and the image was developed at 22° C., in a 90/10 aqueous solution of $Na_2CO_3/NaHCO_3$ (3% solids) for 5 seconds. The results of the exposure are set forth in Table 2.

Table 2

| Sample | Sensitizer (%) | Exposure Units + | Exposure Units – | $\sqrt[3]{2}$ Step Wedge Response + | $\sqrt[3]{2}$ Step Wedge Response – |
|---|---|---|---|---|---|
| 8 | 1.01 | 5 | 45 | 6 | 5 |
| 9 | 0.76 | 10 | 30 | 6 | 7 |
| 10 | 0.77 | 10 | 40 | 3 | 6 |
| 11 | 0.79 | 5 | 200 | 4 | 1 |
| 12 | 0.95 | 10 | 30 | 5 | 7 |
| 13 | 0.76 | 5 | 40 | 5 | 7 |
| 14 | 0.80 | — | 200 | — | 3 |
| 15 | 0.93 | 60 | 20 | 1 | 7 |
| 16 | 0.80 | 5 | 100 | 3 | 6 |
| 17 | 0.75 | 10 | 200 | 1 | 7 |
| 18 | 0.76 | 10 | 30 | 4 | 6 |
| 19 | 0.82 | 10 | 30 | 5 | 5 |
| 20 | 0.90 | 10 | 30 | 4 | 9 |
| 21 | 0.83 | 10 | 30 | 5 | 6 |
| 22 | 0.80 | 10 | 30 | 5 | 6 |
| 23 | 0.80 | 10 | 30 | 6 | 5 |
| 24 | 0.76 | 10 | 40 | 4 | 6 |
| 25 | 0.73 | 10 | 30 | 6 | 5 |
| 26 | 0.80 | 10 | 30 | 4 | 10 |
| 27 | 0.78 | 10 | 30 | 5 | 9 |
| 28 | 0.73 | 10 | 40 | 5 | 9 |
| 29 | 0.73 | 10 | 100 | 6 | 7 |
| 30 | 0.76 | 10 | 100 | 10 | 5 |
| 31 | 0.88 | 10 | 180 | 6 | 7 |

These tests indicate that these sensitizers are useful in the preparation of suitable positive/negative images from a master, most performing in an excellent manner.

Table 3

Visible Absorption Data of Sensitizers

| Example | λmax (nm) CHCl3 | ε at λmax | λmax (nm) CH3CN | ε at εmax | λmax (nm) Film of Example | OD λmax |
|---|---|---|---|---|---|---|
| 1 | 443 | 32,800 | 436 | 38,800 | — | — |
| 2 | 442 | 42,900 | — | — | — | — |
| 3 | 443 | 20,400 | — | — | — | — |
| 4 | 427 | 17,600 | 420 | 21,900 | — | — |
| 5 | 430 | 23,200 | — | — | — | — |
| 6 | 413 | 34,800 | — | — | — | — |
| 8 | — | — | — | — | 425 | 0.36 |
| 9 | — | — | 408 | 25,900 | 415 | 0.38 |
| 10 | — | — | 430 | 35,000 | 438 | 0.41 |
| 11 | — | — | 452 | 31,500 | 465 | 0.34 |
| 12 | — | — | — | — | 435 | 0.22 |
| 13 | — | — | 426 | 33,700 | 435 | 0.32 |
| 14 | — | — | — | — | 440 | 0.03 |
| 15 | — | — | — | — | 415 | 0.40 |
| 16 | — | — | — | — | 453 | 0.38 |
| 17 | — | — | — | — | 470 | 0.41 |
| 18 | 427 | 17,600 | 420 | 21,900 | 425 | 0.15 |
| 19 | — | — | 407 | 18,400 | 410 | 0.17 |
| 20 | — | — | 427 | 38,100 | 445 | 0.42 |
| 21 | — | — | 427 | 34,100 | 435 | 0.37 |
| 22 | — | — | 423 | 30,400 | 432 | 0.36 |
| 23 | — | — | — | — | 440 | 0.36 |
| 24 | — | — | 426 | 32,900 | 435 | 0.39 |
| 25 | 430 | 23,200 | — | — | 438 | 0.40 |
| 26 | — | — | 437 | 39,600 | — | — |
| 27 | — | — | 447 | 37,400 | — | — |
| 28 | — | — | 418 | 28,200 | — | — |
| 29 | — | — | 383 | 22,000 | — | — |
| 30 | — | — | — | — | — | — |
| 31 | — | — | 350 | 26,300 | — | — |

EXAMPLE 32

The sensitizer of Example 1 was prepared as follows:

A solution of 1000 g. (7.57 mole) 1-indanone and 1557 g. of 93% 4-diethylamino-2-methylbenzaldehyde was rapidly stirred into 3 liters of ethanol. The temperature of this solution was 12° C. 1880 ml. of 25% solution of NaOH (625 g. NaOH and water up to 2500 g.) at 22° C. was added over a 10 min. period. The reaction is exothermic and a temperature of 41° C. was reached. After 30 minutes, the temperature had fallen to 38° C. at which point the temperature was lowered to 5° C. in a toluene/dry ice bath. The resulting solid precipitate was recovered by filtration and subsequently washed with 3 liters of 5° C. ethanol. The filter cake was then resuspended in 3 liters of 5° C. ethanol and refiltered. This step was repeated at which point the solid was washed four times with 3 to 4 liters of cold water. Water washing was continued until the filtrate was a neutral pH. The product was then dried thoroughly to yield 1977 g. of the product which was 85.5% of the theoretical yield. The final product structure was identified and the structure confirmed by melting point, U.V., I.R. and NMR spectra. The effectiveness of the resulting product was tested in the same manner as that described in Example 1 with equivalent results.

EXAMPLE 33

The following photosensitive compositions were prepared:

| Ingredient | Amount (g) A | B | C |
|---|---|---|---|
| Tetraethylene glycol dimethacrylate | 1.79 | 1.79 | 1.79 |
| Terpolymer as described in Example 7 | 3.56 | 3.56 | 3.56 |
| Copolymer of styrene/maleic anhydride (Ex. 7) | 3.78 | 4.58 | 3.70 |
| Bis(2-o-chlorophenyl-4,5-bis-phenyl) imidazole | 0.87 | — | 0.87 |
| Sensitizer described in Example 1 | — | 0.075 | 0.075 |
| Methylene chloride | 52.87 | 52.87 | 52.87 |
| Methanol | 4.01 | 4.01 | 4.01 |

These compositions (14.95% solids) were mixed thoroughly and then coated on polyethylene terephthalate film supports as described in Examples 8-31 and the composite structures were given a positive exposure through a $\sqrt[3]{2}$ stepwedge and the filter of Example 1 and were developed as described in Examples 8-31. The following results were obtained:

| Film | Exposure (units) | Stepwedge Response |
|---|---|---|
| A | 200 | 7 |
| B | 2000 | 0 |
| C | 10 | 11 |

This example demonstrates the unique advantage when the sensitizer of this invention is used on conjunction with an initiator (Film C). The example additionally demonstrates that the sensitizer of this invention is not an initiator by itself (Control Film B) and that when the sensitizer of this invention is omitted (Control Film A) a relatively low speed photosensitive composition is obtained.

EXAMPLE 34

The following photopolymerizable composition was prepared:

| Ingredient | Amount (g) |
|---|---|
| Tetramethyleneglycol dimethacrylate | 0.75 |
| Terpolymer as described in Example 7 | 1.765 |
| Copolymer of styrene/maleic anhydride as described in Example 7 | 1.614 |
| Bis (2-o-chlorophenyl-4,5-bis-p-t-butyl-phenyl)imidazole | 0.652 |
| Sensitizer described in Example 1 | 0.037 |
| 6-Nitroveratraldehyde | 0.135 |
| Methylene chloride | 26.34 |
| Methanol | 2.0 |

This composition was mixed thoroughly and coated on polyethylene terephthalate film supports as described in Examples 8-31. A polyethylene terephthalate coversheet was laminated thereon as described in Examples 8-31, and the composite structure was given a positive exposure through a $\sqrt[3]{2}$ stepwedge and an overall exposure with the filter of Example 1 and developed as described in Examples 8-31. The following results were obtained:

Table 5

| Positive Imagewise Exposure | Overall Polymerization Exposure | Positive Stepwedge Image | Negative Stepwedge Image |
|---|---|---|---|
| 5 units | 30 units | 4 | 6 |

EXAMPLES 35-36

The sensitizers in these examples were tested in the same photopolymerizable formulation disclosed in Example 1 except that no photoinhibitor was present. The solutions were coated and overcoated as described in Example 1. Only a visible polymerization exposure was given with the same source as described in Example 1. The plates were developed also as described in Example 1.

Table 6

| Example | Sensitizer | Amount Used (%) | Exposure Units | UV Filter | $\sqrt[3]{2}$ Stepwedge Image |
|---|---|---|---|---|---|
| 35 | 1 | 0.92 | 100 | Filter in Ex. 1 | 20 |
| 36 | 4 | 1.62 | 100 | Kodak Wratten 1A | 20 |

These samples illustrate the utility of these visible sensitizers in high speed negative working lithographic printing plates.

EXAMPLES 37-44

The sensitizers in these examples were tested in the same photosensitive formulation given in Examples 8-31 except that no photoinhibitor was present. The solutions were coated and laminated as described in Examples 8-31. Only a visible polymerization exposure was given with the same source as in Examples 8-31. The films were developed also as described in Examples 8-31.

Table 7

| Ex | Sensitizer | Amt. Used % | Exposure Units | U.V. Filter | $\sqrt[3]{2}$ Stepwedge Image |
|---|---|---|---|---|---|
| 37 | 1 | 0.75 | 10 | Ex. 1 filter | 10 |
| 38 | 1 | 5.0 | 10 | " | 10 |
| 39 | 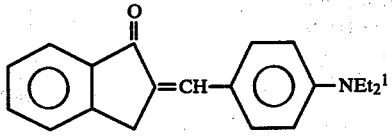 | 2.0 | 10 | " | 12 |
| 40 | 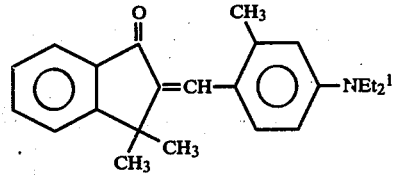 | 2.0 | 10 | " | 8 |
| 41 | 5 | 1.3 | 10 | " | 9 |
| 42 | 19 | 0.84 | 30 | " | 13 |
| 43 | 26 | 0.70 | 200 | Kodak Wratten #8 | 9 |
| 44 | 27 | 0.8 | 10 | " | 7 |
|  | 27 | 3.0 | 10 | " | 15[2] |

[1]Prepared in a manner similar to that described in Example 1.
[2]Developed for six seconds at 22° C.

These examples illustrate the utility of these visible sensitizers in high speed films.

EXAMPLE 45

A film was made by coating the following solution that was 11.5% solids in methylene chloride on 0.001 inch (0.025 mm) polyethylene terephthalate support at 40 mg/dm² and by laminating to Du Pont double matted-0.005 inch (10.127 mm) thick-drafting film.

| Component | Total Solids (%) |
|---|---|
| Poly(methyl methacrylate) wt av MW 40,000 | 11.51 |
| Poly(methyl methacrylate) wt av MW 250,000 | 12.11 |
| Poly(n-butyl/isobutyl methacrylate) wt av MW 120,000 | 6.06 |
| Polyvinyl formal wt av MW 14,000 to 17,000 | 0.60 |
| Polyoxyethylated trimethylol propane triacrylate | 27.38 |
| Bis (2-o-chlorophenyl-4,5-bis-m-methoxyphenyl)imidazole | 3.00 |
| 2-(4'-diethylamino-2'-methylbenzylidene-1-indanone | 0.75 |
| Tri(2-methyl-4-N,N-diethylaminophenyl)-methane | 0.30 |
| Tri-(p-N,N-dimethylaminophenyl)-methane | 0.30 |
| Carbon black dispersion Carbon black (29.00% of solids) AB type dispersant (9.00% of solids) | 38.00 |

The A segment is a triisocyanate ("Desmodur" N and the B segment is a (58/42) copolymer of methacrylic acid/2-ethylhexylacrylate of 9,000 MW.

The film was exposed with a GE high intensity visible fluorescent bulb #F54T17SPD (εmax 425 nm) with the film passing by the bulb on a conveyor at 5 ft/min (1.52 m/min) or an exposure time of 2.2 sec. The cover sheet was peeled away to leave a positive image on the drafting film support, the polymerized imaged areas adhering to the cover sheet. This example demonstrates the utility of the sensitizer of Example 2 in an engineering drafting film.

EXAMPLE 46

A photopolymerizable solution was prepared by mixing the following components:

| Component | Amount (g.) |
|---|---|
| 2-ethoxyethanol | 46.7 |
| Low MW copolymer of methyl methacrylate/methacrylic acid, 40% solids in 2-ethoxyethanol | 11.3 |
| Mixture of triethylene glycol dicaprate and triethylene glycol dicaprylate described in Example 1 | 0.9 |
| Triethylene glycol dimethacrylate | 2.38 |
| Methacrylated polymeric epoxy resin of Bisphenol-A and epichlorohydrin, MW about 513 | 8.4 |
| Bis(2-o-chlorophenyl-4,5-bis-m-methoxyphenyl)imidazole | 0.55 |
| Bis(2-o-chlorophenyl-4,5-bis-phenyl)imidazole | 0.28 |
| Tri(2-methyl-4-N,N-diethylaminophenyl)-methane | 0.23 |
| Sensitizer of Ex. 30 | 0.45 |

The solution was coated and overcoated as in Example 1. Only a visible polymerization exposure was given with the same source as was used in Example 1, and the plate was developed as was Example 1 but with a 60 sec soak in the developer.

| Exposure Units | Filter | $\sqrt{2}$ Stepwedge Image |
|---|---|---|
| 50 | Kodak Wratten # 8 | 10 |

This example demonstrates a negative working high speed lithographic plate that can be imaged with λ>480 nm.

EXAMPLES 47–48

The following sensitizers were prepared similar to the procedure described in Example 1:

| Sample | Sensitizer |
|---|---|
| 47 | p-HO—φ—COCH=CH—⟨C6H4⟩—NEt2 (with CH3 substituent) |
| 48 | m-HO—φ—COCH=CH—⟨C6H4⟩—NMe2 |

These sensitizers were tested in the formulation described in Examples 8–31, coated, laminated, exposed and developed as described therein except for the time of image development which is shown in the results listed below:

| Sample | Sensitizer (%) | Exposure Units + | Exposure Units − | Devel. Time at 22° (Sec.) | $\sqrt[3]{2}$ Stepwedge Response + | $\sqrt[3]{2}$ Stepwedge Response − |
|---|---|---|---|---|---|---|
| 47 | 0.76 | 10 | 30 | 6 | 7 | 6 |
| 48 | 0.63 | 10 | 30 | 7 | 2 | 9 |

This test showed that these compounds were extremely useful in the preparation of suitable positive/negative image from a master.

EXAMPLES 49 TO 53

Five black, photopolymerizable compositions (for lower layer) were prepared as described in Example 7 varying only in the monomeric compound as follows:

| Monomeric Component | Sample (g) 49 | 50 | 51 | 52 | 53 |
|---|---|---|---|---|---|
| Tetraethylene glycol dimethacrylate | 70.1 | 140.2 | — | — | — |
| Trimethylolpropane triacrylate | 70.1 | — | 140.2 | — | — |
| 1,6-hexanediol-dimethacrylate | — | — | — | 140.2 | — |
| Pentaerythritol triacrylate | — | — | — | — | 140.2 |

The photopolymerizable compositions were coated on a polyethylene terephthalate film and dried as described in Example 7.

A second set of five clear photopolymerizable compositions were then prepared as described in Example 7 from the following components, with the monomeric component varying as indicated below.

| Component | Amount (g) |
|---|---|
| (a) Methylene Chloride | 4640.0 |
| (b) Methanol | 230.0 |
| (c) Ethyl Cellosolve | 155.0 |
| (d) 6-nitroveratraldehyde | 22.5 |
| (e) Sensitizer of Ex. 1 | 7.2 |
| (f) Bis-(2-o-chlorophenyl-4,5-bis-phenyl)imidazole | 77.4 |
| (g) "FC-430" (fluoro surfactant from 3M Co.) (10% aqueous solution) | 10.0 ml |
| (h) 1,4,4-trimethyl-2,3-diazabicyclo [3.2.2] non-2-ene N,N′-dioxide | 0.45 |

-continued

| Component | Amount (g) |
|---|---|
| (i) Copolymer of styrene/maleic anhydride (1.4/1.0)-M.Wt. ca 10,000 | 328.0 |
| (j) Terpolymer ethyl acrylate (56.6), methyl methacrylate (37.6), acrylic acid (7.0) Acid No. 76-85, M.Wt. ca 260,000 | 328.0 |
| (k) "Polyox" WSR-N-3000, M.WT. ca 400,000 (polyoxyethylene coating aid, Union Carbide Corp.) (9.0 g suspended in 75 g of ethyl Cellosolve) | 81.0 ml |

| Monomeric Component | Sample (g) 49 | 50 | 51 | 52 | 53 |
|---|---|---|---|---|---|
| Tetraethylene glycol dimethacrylate | 67.5 | 135.0 | — | — | — |
| Trimethylolpropane triacrylate | 67.5 | — | 135.0 | — | — |
| 1,6-hexanediol-dimethacrylate | — | — | — | 135.0 | — |
| Pentaerythritol triacrylate | — | — | — | — | 135.0 |

The clear photopolymerizable compositions were coated contiguous to the first photopolymer layer and dried as described in Example 7.

Each multilayered element was exposed and processed as described in Example 7 to produce an exact duplicate of the original positive image.

I claim:

1. A photopolymerizable composition comprising an admixture of
   (1) at least one non-gaseous ethylenically unsaturated compound having a boiling point above 100° C. at normal atmospheric pressure and being capable addition polymerization;
   (2) at least one 2,4,5-triarylimidazolyl dimer consisting of two lophine radicals bound together by a single convalent bond; and
   (3) a sensitizing amount of an arylylidene aryl ketone compound of the formulae:

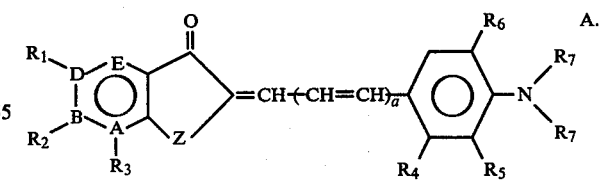

wherein:
A, B, D, E are carbon atoms or one may be solely a nitrogen atom:
$R_1$ is H, OH or $CH_3O$;
$R_2$ is H, OH, $CH_3O$ or $N(R_6)_2$;
$R_3$ is H, OH or $CH_3O$;
a is 0 or 1;
Z is $>C=O$, CHOH, $>C(CH_3)_2$, $-(CH_2)_b-$, wherein b is 1, 2 or 3, $$-O-\overset{\overset{O}{\|}}{C}-, -O-\underset{R'}{CH}-, -S-\underset{R'}{CH}-,$$

wherein R' is H, phenyl, or Z is linked with $R_4$ where Z is $$\overset{|}{\underset{/}{>}}CH$$

and $R_4$ is —O— or >N—CH$_3$ a being O;
$R_4$ is H, CH$_3$, OH, CH$_3$O;
$R_5$ is H or $R_5+R_7$ is —CH$_2$CH$_2$—, —CH$_2$CH$_2$CH$_2$—, —O—CH$_2$CH$_2$—;
$R_6$ is H or $R_6+R_7$ is —CH$_2$CH$_2$—, —CH$_2$CH$_2$CH$_2$—, —O—CH$_2$CH$_2$—; and
$R_7$ is CH$_3$, —(CH$_2$)$_n$—CH$_3$ where n is 1 to 5, —CH$_2$CH$_2$—Cl, —CH$_2$CH$_2$OH, CH$_2$CH$_2$OCH$_3$;

B.

wherein:
A, B, D are carbon atoms or one may be solely a nitrogen atom;
$R_1$ is H, CH$_3$, —OCH$_2$CH$_2$OR, wherein R is H, CH$_3$, —CH$_2$CH$_2$OR' wherein R' is CH$_3$ or CH$_3$CH$_2$—;
$R_2$ is H, CH$_3$, OH or CH$_3$O;
$R_3$ is H, OH, CH$_3$O, CH$_3$, F, Br, CN or N(R$_9$)$_2$;
$R_2+R_3$ is —O—CH$_2$—O—;
$R_4$ is H, CH$_3$ or CH$_3$O;
$R_5$ is H, CH$_3$, —OCH$_2$CH$_2$OR, wherein R is H, CH$_3$, —CH$_2$CH$_2$OR' wherein R' is CH$_3$ or CH$_3$CH$_2$—;
$R_6$ is H, CH$_3$ or phenyl;
$R_7$ is H, CH$_3$, OH or CH$_3$O;
$R_8$ is H;
$R_8+R_{10}$ is —CH$_2$CH$_2$—, —CH$_2$CH$_2$CH$_2$—, —OCH$_2$CH$_2$—;
$R_9$ is H, $R_9+R_{10}$ is —CH$_2$CH$_2$—, —CH$_2$CH$_2$CH$_2$—, —OCH$_2$CH$_2$—; and
$R_{10}$ is CH$_3$, —(CH$_2$)$_n$CH$_3$ wherein n is 1 to 5; and

C.

wherein
G is $$-\overset{\overset{O}{\|}}{C}-,$$

—O—, or —S—;
$R_1$ is H, CH$_3$ or —OCH$_3$, and
$R_2$ is CH$_3$ or —CH$_2$CH$_3$,
the ketone having its maximum absorption in the range of 350 to 550 nm.

2. A photopolymerizable composition according to claim 1 wherein the arylylidene aryl ketone compounds are of the formulae:

A.

$R_1$ is H, OH, CH$_3$O—;
$R_2$ is H, OH, CH$_3$O—;
$R_3$ is H, OH, CH$_3$O with the proviso that if one of $R_1$, $R_2$ or $R_3$ is OH then the remainder must be H or CH$_3$O—;
Z is >CHOH, $$\overset{\diagdown}{\underset{\diagup}{C}}\overset{CH_3}{\underset{CH_3}{}},$$

$+CH_2+_a$ wherein a is 1, 2 or 3, $$-O-\underset{R'}{CH}$$

wherein R' is H, ϕ, or
Z is linked with $R_4$ where Z is $$\overset{|}{\underset{/}{>}}CH$$

and $R_4$ is —O— or $$-\underset{\underset{CH_3}{|}}{N}-;$$

$R_4$ is H, CH$_3$, OH, CH$_3$O— with the proviso that if one of $R_1$, $R_2$ or $R_3$ is OH then $R_4$ is one of H, CH$_3$ or CH$_3$O—;
$R_5$ is H or $R_5+R_7$ is —CH$_2$CH$_2$—, —CH$_2$CH$_2$CH$_2$—, —O—CH$_2$CH$_2$—;
$R_6$ is H or $R_6+R_7$ is —CH$_2$CH$_2$—, —CH$_2$CH$_2$CH$_2$—, —O—CH$_2$CH$_2$—;
$R_7$ is CH$_3$—, CH$_3$CH$_2$—;

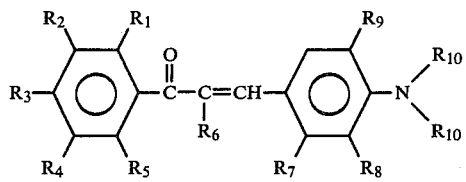

B.

$R_1$ is H, $CH_3$;
$R_2$ is H, OH, $CH_3$, $CH_3O$;
$R_3$ is H, $CH_3$, OH, $CH_3O$;
$R_2+R_3$ is $-O-CH_2-O-$;
$R_4$ is H, $CH_3-$, $CH_3O-$;
$R_5$ is H, $CH_3$;
$R_6$ is H, $CH_3$;
$R_7$ is H, $CH_3$, OH, $CH_3O$ with the proviso that if one of $R_2$, $R_3$ or $R_7$ is OH then the remainder must be H, $CH_3$ or $CH_3O-$;
$R_8$ is H, $R_8+R_{10}$ is $-CH_2CH_2-$, $-CH_2CH_2CH_2-$, $-O-CH_2CH_2-$;
$R_9$ is H, $R_9+R_{10}$ is $-CH_2CH_2$, $-CH_2CH_2CH_2-$, $-O-CH_2CH_2-$;
$R_{10}$ is $CH_3-$, $CH_3CH_2-$.

3. A photopolymerizable composition according to claim 1 additionally containing (4) at least one macromolecular organic polymeric binder, the ethylenically unsaturated compound and the binder being present in relative amounts of 3.0 to 100 and 0 to 97 parts by weight, respectively.

4. A photopolymerizable composition according to claim 3 wherein the 2,4,5-triarylimidazolyl dimer is present in an amount of 0.01 to 20.0 parts by weight per 100 parts by weight of the combined weight of ethylenically unsaturated compound and binder.

5. A photopolymerizable composition according to claim 4 wherein the arylylidene aryl ketone compound is present in an amount of 0.001 to 15.0 parts by weight per 100 parts by weight of the combined weight of ethylenically unsaturated compound and binder.

6. A photopolymerizable composition according to claim 1 wherein the arylylidene aryl ketone is 2-(4'-diethylamino-2'-methylbenzylidene)-1-indanone.

7. A photopolymerizable composition according to claim 1 wherein the arylylidene aryl ketone is 2-(4'-diethylamino-2'-methoxybenzylidene)-1-indanone.

8. A photopolymerizable composition according to claim 1 wherein the arylylidene aryl ketone is 2-(9'-julolylidene)-1-indanone.

9. A photopolymerizable composition according to claim 1 additionally containing 0.5 to 15.0 parts by weight per 100 parts by weight of the combined weight of ethylenically unsaturated compound and binder of a nitroaromatic compound of the formula:

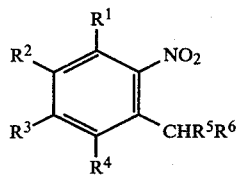

wherein
$R^1$, $R^2$, $R^3$ and $R^4$, alike or different, are H, OH, halogen, $NO_2$, CN, alkyl of 1 to 18 carbons, alkoxy in which the alkyl is of 1 to 18 carbons, aryl of 6 to 18 carbons, benzyl, halogen-substituted phenyl, polyether of 2 to 18 carbons and 1 to 6 oxygens, dialkylamino in which each alkyl is of 1 to 18 carbons, thioalkyl in which the alkyl is of 1 to 18 carbons, or thioaryl in which the aryl is of 6 to 18 carbons, or any two of $R^1$, $R^2$, $R^3$ and $R^4$, taken together, are the residue of a second benzene ring fused onto the benzene nucleus, with the proviso that not more than one of $R^1$, $R^2$, $R^3$ and $R^4$ is OH or $NO_2$;
$R^5$ is H, alkyl of 1 to 18 carbons, halogen, phenyl, or alkoxy in which the alkyl is of 1 to 18 carbons;
$R^6$ is H, OH, alkyl of 1 to 18 carbons, phenyl, or alkoxy in which the alkyl is of 1 to 18 carbons, with the proviso that only one of $R^5$ and $R^6$ is H, or;
$R^5$ and $R^6$ together are $=O$, $=CH_2$, $-O-CH_2-$, $=NC_6H_5$, $=NC_6H_4N(alkyl)_2$ in which each alkyl is of 1 to 18 carbons, $-O-C_2H_4-O-$,

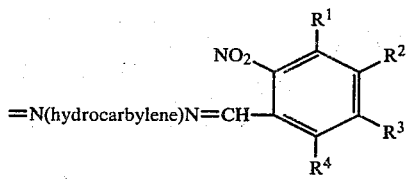

in which the hydrocarbylene group is of 1 to 18 carbons, of

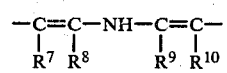

in which $R^8$ and $R^9$, alike or different, are H or alkyl of 1 to 4 carbons, and $R^7$ and $R^{10}$, alike or different, are $-CN$, $-COR^{11}$ in which $R^{11}$ is alkyl of 1 to 5 carbons, or $-COOR^{12}$ in which $R^{12}$ is alkyl of 1 to 6 carbons which may be interrupted by an oxygen atom, alkenyl of 2 to 5 carbons, or alkynyl of 2 to 5 carbons, or $R^7$ and $R^8$ together, or $R^9$ and $R^{10}$ together, complete a 6-membered carbocyclic ring containing a keto group.

10. A photopolymerizable composition according to claim 1 wherein the ethylenically unsaturated compound is trimethylolpropane triacrylate.

11. A photopolymerizable composition according to claim 1 wherein the ethylenically unsaturated compound is tetraethylene glycol dimethacrylate.

12. A photopolymerizable composition according to claim 1 wherein the ethylenically unsaturated compound is a methacrylated polymeric epoxy resin of Bisphenol-A and epichlorohydrin.

13. A photopolymerizable composition according to claim 3 wherein the polymeric binder is a methyl methacrylate/methacrylic acid copolymer.

14. A photopolymerizable composition according to claim 3 wherein two polymeric binders are present, one being a copolymer of styrene/maleic anhydride and the second a terpolymer of ethyl acrylate/methyl methacrylate/acrylic acid.

15. A photopolymerizable composition according to claim 3 wherein the ethylenically unsaturated compound is trimethylolpropane triacrylate, the polymer binder is a copolymer of methyl methacrylate/methacrylic acid, the 2,4,5-triarylimidazolyl dimer is bis(2-o-chlorophenyl-4,5-bis-phenyl)imidazole and the arylylidene aryl ketone is 2-(4'-diethylamino-2'-methylbenzylidene)-1-indanone.

16. A photopolymerizable element comprising a support coated with a composition according to claim 1.

17. A photopolymerizable element according to claim 16 wherein the support is a polymeric film or metallic surface.

* * * * *

UNITED STATES PATENT OFFICE
CERTIFICATE OF CORRECTION

PATENT NO. : 4,162,162
DATED : JULY 24, 1979
INVENTOR(S) : THOMAS EUGENE DUEBER

It is certified that error appears in the above-identified patent and that said Letters Patent are hereby corrected as shown below:

| Face Page | Corrections |
|---|---|
| [54], line 2, Title | "p-DIALKYL-AMINOARYLALDEHYDES" should be --p-DIALKYLAMINOARYLALDEHYDES-- |

| Column | Line | |
|---|---|---|
| 19 | 62 | "on" should be --in--. |
| 20 | 8 | "tetramethyleneglycol" should be --tetraethyleneglycol--. |
| 24 | 43 | after "capable" insert --of forming a high molecular weight polymer by photoinitiated,--. |
| 24 | 47 | "convalent" should be --covalent--. |
| 28 | 23 | "of" should be --or--. |

Signed and Sealed this

Eighth Day of January 1980

[SEAL]

Attest:

SIDNEY A. DIAMOND

Attesting Officer      Commissioner of Patents and Trademarks